United States Patent
Lennard et al.

(10) Patent No.: US 8,537,644 B2
(45) Date of Patent: Sep. 17, 2013

(54) HEAT SOURCE MANAGEMENT IN DATA STORAGE DEVICE

(75) Inventors: Michael Henry Lennard, Lyons, CO (US); Robert Matousek, Berthoud, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 311 days.

(21) Appl. No.: 13/071,930

(22) Filed: Mar. 25, 2011

(65) Prior Publication Data

US 2012/0243390 A1    Sep. 27, 2012

(51) Int. Cl.
*G11B 11/00* (2006.01)
*G11B 7/00* (2006.01)

(52) U.S. Cl.
USPC ........................................ 369/13.24; 369/116

(58) Field of Classification Search
USPC . 369/13.24, 13.32, 13.33, 13.02, 47.5–47.52, 369/59.11, 116, 59, 31
See application file for complete search history.

(56) References Cited

U.S. PATENT DOCUMENTS

| 7,099,096 | B2 | 8/2006 | Ueyanagi | |
|---|---|---|---|---|
| 7,245,562 | B2 | 7/2007 | Ruigrok | |
| 2004/0212910 | A1* | 10/2004 | Suzuki et al. | 360/46 |
| 2005/0002293 | A1* | 1/2005 | Hsu et al. | 369/116 |
| 2007/0206649 | A1 | 9/2007 | Xu et al. | |
| 2007/0230020 | A1* | 10/2007 | Leis | 360/31 |
| 2007/0268608 | A1* | 11/2007 | Takahashi | 360/75 |
| 2007/0279785 | A1* | 12/2007 | Dolan et al. | 360/46 |
| 2008/0180833 | A1* | 7/2008 | Ohinata | 360/75 |

OTHER PUBLICATIONS

Jaap J. M. Ruigrok, "Prospects for Thermally-Assisted Recording," pp. 1-2, Phillips Research Laboratories. (No date).

* cited by examiner

*Primary Examiner* — Thang Tran
(74) *Attorney, Agent, or Firm* — Hall Estill Attorneys at Law

(57) ABSTRACT

An apparatus and associated method is presently disclosed for a control circuitry capable of managing a heat source used in data storage applications. Various embodiments of the present invention are generally directed to a heat source directed at a data storage medium with a synchronization signal and a serial interface that are each selectively activated via a demultiplexed write gate signal. The selective activation allows for pulsed operation of the heat source resulting in reduced duty cycle and temperature during a write operation.

20 Claims, 4 Drawing Sheets

HEAT SOURCE MANAGEMENT IN DATA STORAGE DEVICE

SUMMARY OF THE INVENTION

Various embodiments of the present invention are generally directed to a control circuitry capable of managing a heat source used in data storage applications.

In accordance with various embodiments, a heat source directed at a data storage medium with a synchronization signal and a serial interface that are each selectively activated via a multiplexed write gate signal. The selective activation lowers a duty cycle and temperature of the heat source during a write operation.

These and other features and advantages which characterize the various embodiments of the present invention can be understood in view of the following detailed discussion and the accompanying drawings.

DETAILED DESCRIPTION

Control circuitry for managing a heat source in data storage and sensing applications is generally disclosed herein. Electronics devices are becoming more sophisticated and demand for higher data capacity as well as improved data transfer rates have placed added emphasis on the speed and reliability of data storage devices. To increase data density, a heat source, such as a coil or laser, can be used to heat a bit cell within a data storage medium immediately prior to and during writing data to that bit cell. Such applications can be useful in heat assisted magnetic recording (HAMR) that allows data to be written at higher densities, which plays an important role in data storage devices.

When a laser heat source is used in data recording, a laser diode generates focused high temperature optical spots on the adjacent data storage medium to lower the coercivity of the medium and allow a bit of data to be recorded in conjunction with an applied magnetic field. However, the coherent light output of the laser can be affected by the temperature of the laser diode junction. Maintaining a lower laser diode junction temperature can provide enhanced diode conversion efficiency, delivering more light output per unit of input power and extending the useful lifetime of the laser diode.

Accordingly, control circuitry can be configured to selectively activate and pulse the laser to maintain a lower duty cycle and diode junction temperature. The control circuitry can be a preamp that has a current source directed at a laser diode near the data storage medium and a serial interface that are each selectively activated by a write gate signal.

Since the preamplifier can have no a prior knowledge of the data to be written, control of the laser pulsing must be reside elsewhere, such as the phase-locked-loop (PLL) of the write data generator, requiring additional control inputs to the preamplifier. Physical size constraints do not allow for additional signals to be placed on the interconnect between the preamplifier and the controller for this purpose. A high-frequency differential transmission line of the type typically employed for transmitting write data to the preamplifier is used for transmission of the pulsing control signals to the preamplifier.

By implementing a multiplexer circuit (MUX) in the controller and a demultiplexer circuit (DMUX) in the preamplifier, the pulsing control signals can share the physical connection with other signals in a time-division multiple access scheme. Since the serial port is not used during write mode, it is a logical choice to share the physical resource of the differential transmission line. In practice, any control signals residing on the interface to the preamplifier may be used in a similar manner. Thus, the selective activation allows heat source pulsing control via the transmission line that in turn lowers the duty cycle and temperature of the heat source during a write operation.

Figure 1:
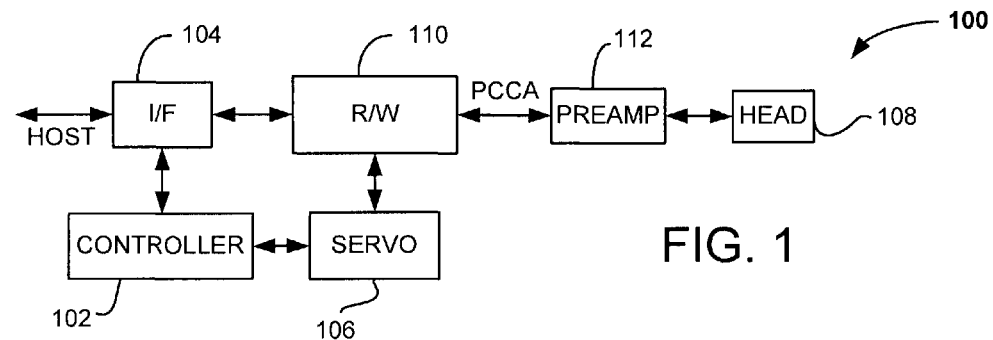
FIG. 1 generally illustrates a block representation of a portion of an exemplary data storage device.

FIG. 1 provides a functional block representation of an exemplary control circuitry 100 capable of managing the operation a data storage device including, without limitation, a heat source and heat source control circuitry. A programmable controller 102 provides top level control for the device 100. The controller 102 interfaces with a host device (not shown) via an interface (I/F) circuit 104. The I/F circuit 104 includes a buffer (not shown) that temporarily stores data during transfers between the host and a recordable medium. A servo circuit 136 uses servo control data transduced from the disc surfaces to provide positional control for the heads 108. The servo circuit 106 supplies current commands to a voice coil motor (VCM) control driver 110 to apply suitable currents to the VCM 112 in order to position the heads 108 to transfer data.

Further, a read/write (R/W) channel 114 cooperates with a preamplifier/driver circuit (preamp) 116 to write data to the recordable medium during a write operation. The physical location of the R/W channel 114 control circuitry on one end of the PCCA and the preamp 116 on the opposing end of the PCCA makes the efficient use of the limited space available on the PCCA a necessity to increase the functionality of the preamp 116. As such, the preamp 116 can manipulate signals from one or more of the various circuits of the control circuitry 100 to efficiently use the PCCA and manage a heat source in accordance with various embodiments of the present invention.

Figure 2A:
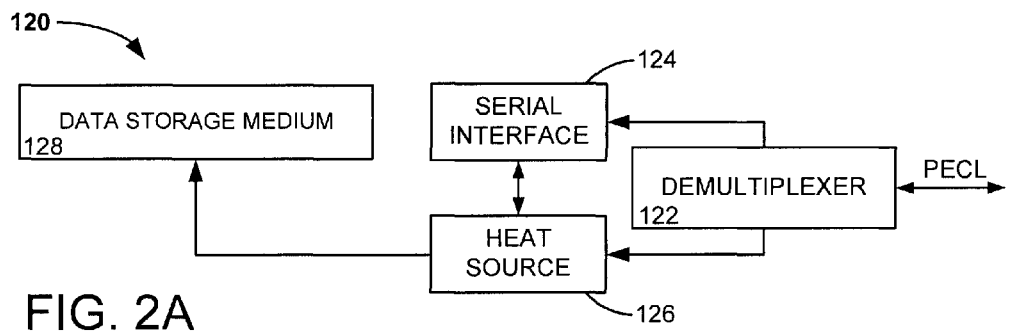
FIGS. 2A and 2B display exemplary block representations of portions of a data storage device in accordance with various embodiments of the present invention.
Figure 2B:
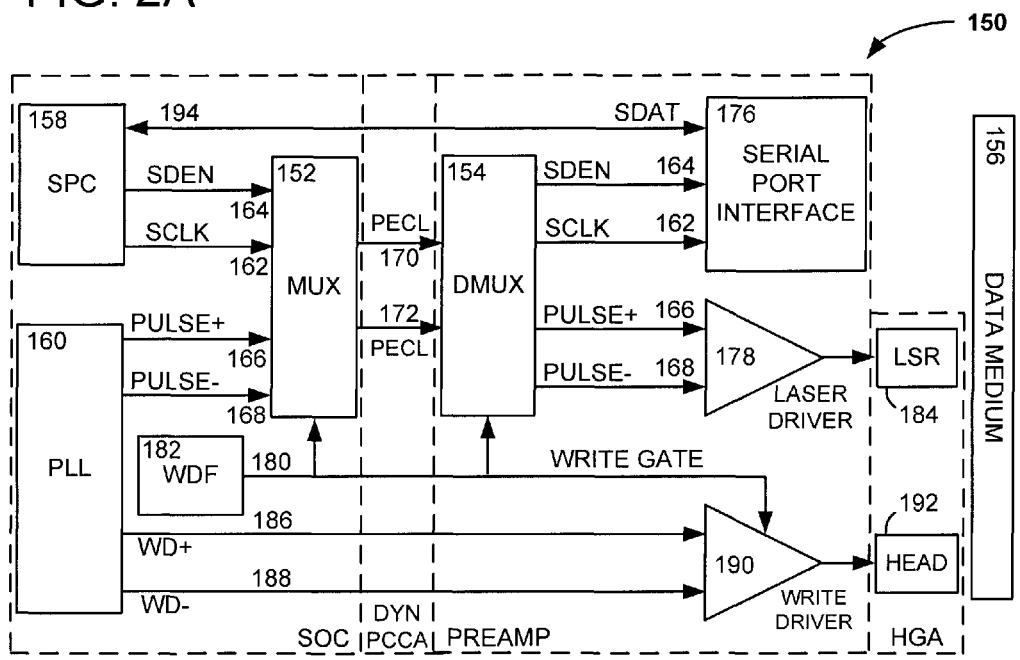

FIGS. 2A and 2B each illustrate functional block representations of control circuitries 120 and 150 constructed and operated according to such various embodiments. As displayed in FIG. 2A, a demultiplexer 122 receives positive emitter coupled logic (PECL) signals from a write gate signal source, such as a system on chip (SOC). The demultiplexer 122 uses the received PECL signals to selectively activate either a serial interface 124 or a heat source 126, which consequently lowers the duty cycle and temperature of the heat source 126 during a write operation to one or more corresponding data storage medium 128.

In the control circuitry 150 of FIG. 2B, a system on chip (SOC) portion is connected on a first side of a dynamic (DYN) region of a PCCA and a preamp portion that is connected on the opposite side of the dynamic region. As discussed above, the dynamic region has limited physical space for electrical leads. Hence, the SOC portion is equipped with a multiplexer (MUX) 152 that reduces the number of transmission lines travelling through the dynamic portion of the PCCA and the preamp portion has a demultiplexer (DMUX) 154 that differentiates the transmission lines into multiple operating transmission lines used to program the control register via the serial port interface or transmit laser pulse timing signals used in conjunction with the write driver to record data to a data medium 156.

The SOC can generate a number of different control signals through both the serial port controller (SPC) 158 and a phase locked loop (PLL) 160. The SPC 158 can generate serial clock (SCLK) 162 and serial data enable (SDEN) 164 signals that are multiplexed with positive and negative pulse signals 166 and 168 attained through the PLL 152, which generates synchronization signals in response to synchronization of with servo patterns on the data medium 156. The multiplexer 152 processes the various signals and outputs differential PECL signals, low-voltage differential (LVDS) signals, or any other high bandwidth signaling technology over the dynamic region of the PCCA.

In the event of the output of PECL signals 170 and 172 from the multiplexer 152, the demultiplexer 154 receives the signals 170 and 172 and then selectively produces the positive and negative pulse signals 166 and 168 or serial data enable and clock signals 164 and 166. Such selectivity is determined by a write gate signal 168, which controls the mode of the preamp to be either read-mode or write-mode and is connected to the multiplexer 152, demultiplexer 158, and a write driver 174.

In read-mode, the function of the PECL lines 170 and 172 is deemed to be serial port clock and enable signals and is decoded by the DMUX 158 into SDEN 164 and SCLK 166 and routed to the serial port interface 176. In write mode, the function of the PECL lines 170 and 172 is deemed to be pulse timing signals and is decoded by the DMUX 154 into Pulse+ 166 and Pulse− 168 and routed to the laser driver 178. The varying activation of the demultiplexer 154 can be determined by the state of the write gate signal 180 generated by a write data formatter 182. Thus, the status of the write gate signal 180 can lead to the outputting of signals to the serial port interface 176 or the laser driver 178. In an exemplary operation, pulse signals 166 and 168 are processed by the laser driver to deliver pulsed activity of the laser (LSR) 184 heat source onto the data medium 156 before and during data recording. Such data recording is further conducted with the phase locked loop 160 generating write data signals 186 and 188 that are processed by a writer driver 190 and passed along to a write head 192 that programs the desired data bit to the portion of the data medium 156 that is heated by the laser 184.

With the configuration of the control circuitry 150 into SOC and preamp portions, the generation and processing of signals to read and write data can be segregated so that a pair of PECL signals 170 and 172 can transmit operating signals for the serial port interface 176, laser driver 178, and write driver 192. The further segregation of the laser 184 and write head 194 on a head gimbal assembly (HGA) allows for adaptive alignment and concurrent operation that corresponds with nuances of the data medium 156.

The selective activation of the laser driver 178 maintains a lower temperature at the laser diode 184 by reducing the duty cycle of the laser over the course of write operations. The duty cycle and temperature of the laser can further be lowered through pulsing of the laser diode heat source 184 at a predetermined rate and duration. Such reduced laser driver 178 duty cycle and temperature provides heated data writing, such as HAMR, with enhanced efficiency that consumes a fraction of power of lasers that are activated in a continuous manner during writing.

The operation of the multiplexer 152 and demultiplexer 154 further provides selectivity of the laser driver 178 or serial port interface 176 without adding signal traces on the PCCA or I/O pads on the SOC portion of the control circuitry 150. It should be noted that the generation of the PECL signals 170 and 172 can be done in a variety of manners, none of which are required or limited, but an exemplary embodiment constructs the transmission lines on the dynamic region of the PCCA as impedance-controlled lines which are very high bandwidth (~8 GHz) to support the transmission of the laser pulsing signals and the relatively low bandwidth (<50 MHz) serial port signals operating in a non-differential mode.

With the selective operation of writing data to or reading data from the data medium 156, the control circuitry 150 can construct the preamp with a multitude of functions, such as laser pulse control with the laser driver 178 and output of serial data signals 194 from the serial port interface, without the added signal traces and I/O pads of the SOC components, such as the SPC 158 and PLL 160, travelling through the dynamic region of the PCCA. Thus, various processing and signal drivers can be reduced to a minimal number of low voltage differential signal (LVDS) traces through the PCCA.

The construction and operation of the control circuitry 150 is not limited to that shown in FIG. 2 as various components can correspond to a variety of signal sources to produce the plurality of signals that contribute to reading and writing data. In some embodiments, the PLL 160 processes servo data written on the data medium 156 to generate some of the signals sent to the multiplexer 152. FIG. 4 displays an exemplary portion 200 of a data storage device that is capable of producing signals used by the PLL 160 of FIG. 3 to manage the heat source.

An HGA 202 travels around the recordable medium 204 along data tracks 206 to conduct various data access operations. While moving along the tracks 206, the HGA 202 encounters servo data written in predetermined sections 208, such as the wedge configuration shown in FIG. 3, on the medium 204. A portion of the servo data can be read by a transducer on the HGA 202 and sent to a controller, such as controller 102 of FIG. 1, to produce a phase locked loop signal that indicates the speed and location of the data bits as well as the HGA 202. The phase locked loop can then be processed by the controller to generate the control signals that provide for the synchronization of the data bits with the laser heat source.

Figure 3:
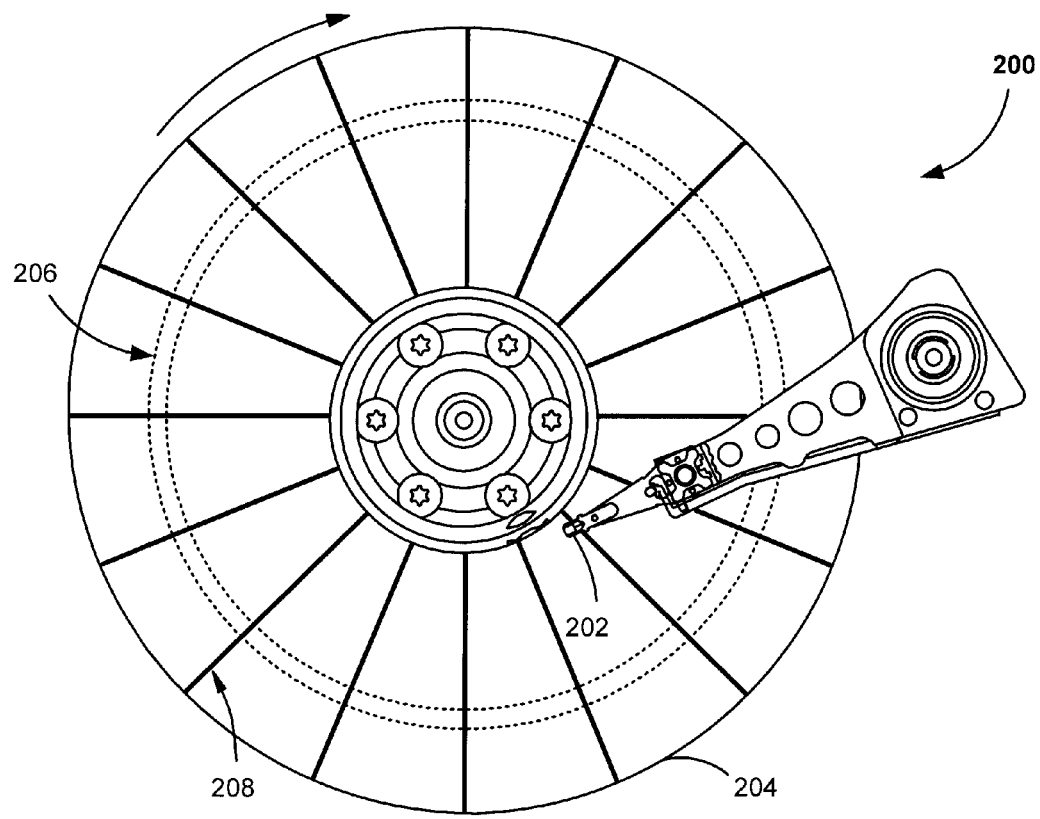
FIG. 3 provides an exemplary portion of the data storage device of FIG. 1 operated in accordance with various embodiments of the present invention.
Figure 4:
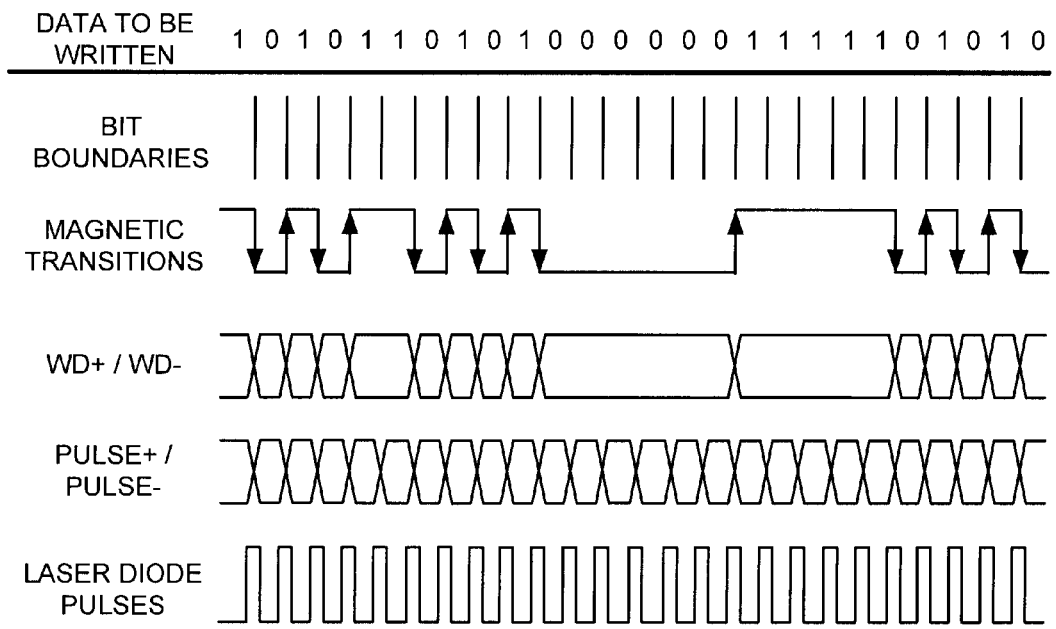
FIG. 4 graphs a variety of operational characteristics of the preamp as operated in accordance with various embodiments of the present invention.

It should be noted that the various tracks, servo wedges, and hardware configurations displayed in FIG. 3 are not required or limited and can be modified as desired. That is, the various tracks and hardware can be constructed and configured in any number of ways, such as spiral servo tracks, that will provide the necessary servo data to generate the phase locked loop and PECL signals. One exemplary hardware configuration is servo data inclusion into preprinted media, which have patterned magnetic orientations that are embedded during manufacturing with precise processing.

Of further note is the unlimited capacity of the servo data and processing capability of the controller. For example, the timing of the laser pulse information provided by the controller can contain precompensation information, which is a temporal adjustment in the timing of bit placement to compensate for pattern-dependent timing errors in the data. The zero-crossing of the PECL signals occurs at the exact time that the pulse+ and pulse− signals are to occur, as determined by the controller. In operations involving over-writing or erasing data on the track to be written, a pulse of the laser must occur at least once in every bit cell regardless of whether there is a magnetic transition present. If this were not the case, the preamplifier could generate its own pulsing signals from the write data, WD+/WD−.

Figure 5:
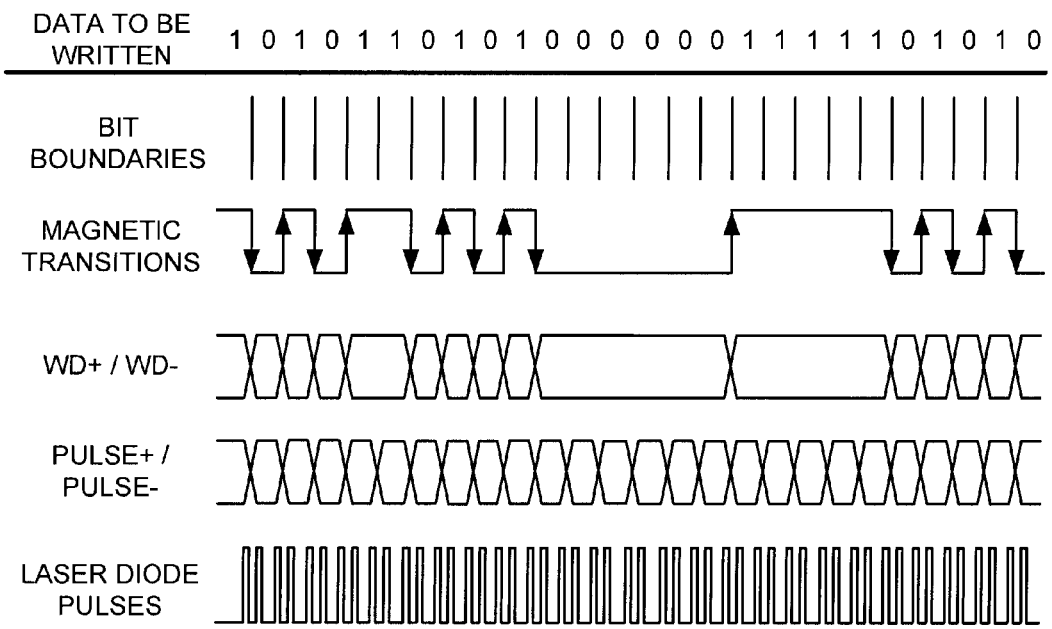
FIG. 5 graphs a variety of operational characteristics of the preamp as operated in accordance with various embodiments of the present invention.

FIGS. 4 and 5 each provide exemplary signal diagrams for various signals of the control circuitry 150 of FIG. 2. Each figure has a series of data bits that are to be written to an adjacent data medium, along with the location of data bit boundaries, magnetic transition orientations, write data signals, laser driver pulse signals. FIG. 4 shows that each bit boundary is located between a pair of programmed data. The position of the bit boundaries corresponds with the transition of magnetic orientation, activation of write and laser driver signals, and beginning of a laser diode pulse so that each bit receives a single programmed logical state without any overlap.

As shown, the magnetic orientation transitions only when the subsequent data bit is different than the preceding bit. That is, a continued writing of a 0 or 1 over consecutive bits requires no magnetic orientation transition. Similarly, the write data signal (WD+/WD−) maintains an activated state during the consecutive writing of the same logical state. Accordingly, the write data signal cannot be used to generate laser pulses because each bit needs to be heated to gain the maximum benefit from heat assisted data writing.

Hence, the laser driver signals (PULSE+/PULSE−) must be generated by the phase locked loop clock attained from the data medium itself The correlation of the laser driver signals with the servo data attained from the data medium ensures that the laser does not pulse at a different rate than data bits are encountered. The precision of the laser driver signals can be further enhanced by transmitting the signals via low voltage differential signals from the multiplexer, which reduces electromagnetic interference, susceptibility to common-mode noise, and occurrence of false triggering.

The laser driver signals of both FIGS. 4 and 5 illustrate the necessary zero-crossing activation necessary to start a laser diode pulse for each bit cell to be written regardless of whether a magnetic transition occurs in that bit cell region. The laser diode pulse can be manipulated into any desired shape, amplitude, and duration. FIG. 4 displays a single pulse for each data bit to be written while FIG. 5 shows multiple pulses being used. These pulse differences are programmable via registers in the preamp, and as such can be interchanged and modified as desired, such as during extended data writing sessions to increase heat dissipation and lower the temperature at the laser diode junction.

Figure 6:
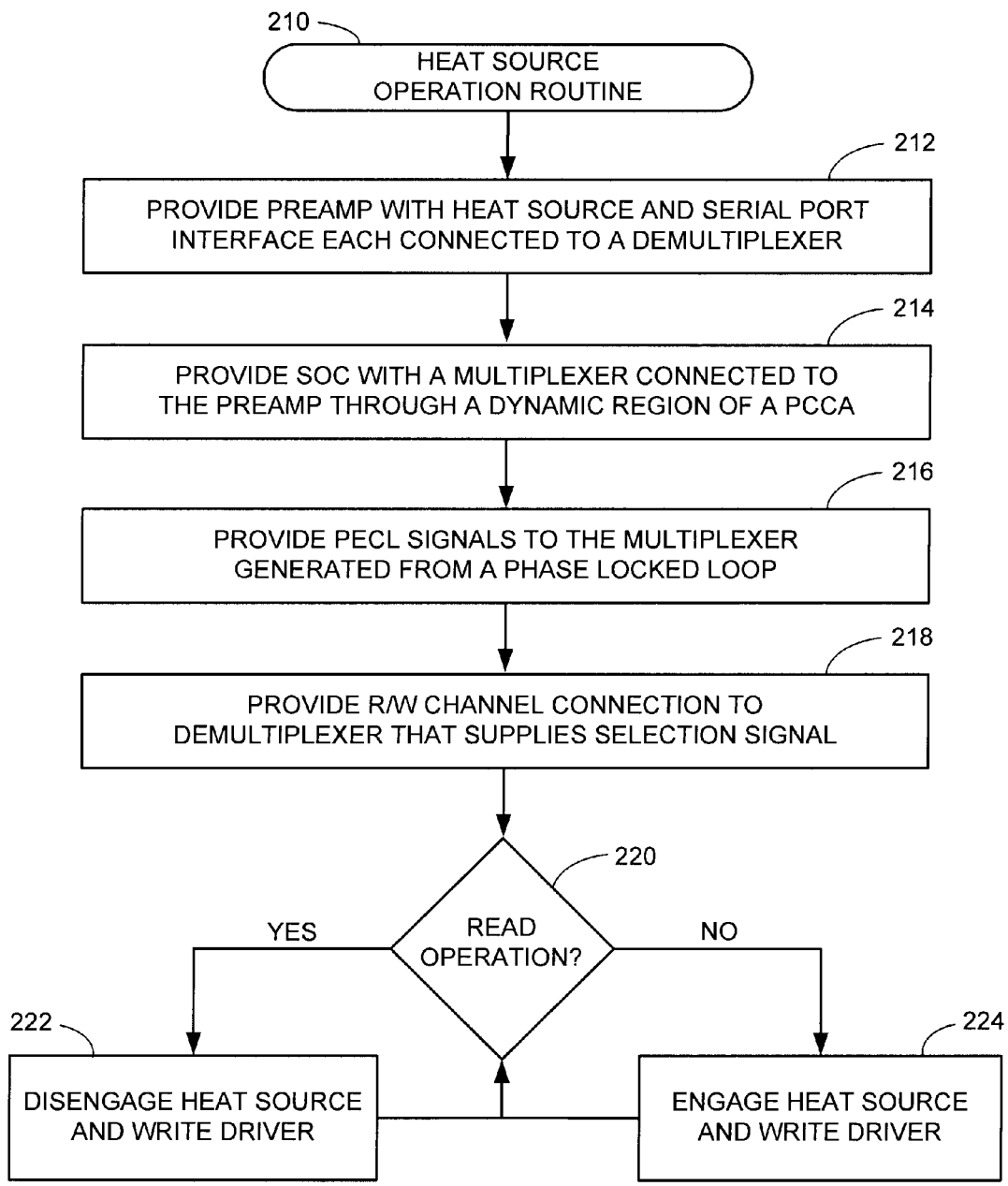
FIG. 6 provides a flow chart of an exemplary HEAT SOURCE OPERATION routine performed in accordance with various embodiments of the present invention.

FIG. 6 provides an exemplary HEAT SOURCE OPERATION routine 210 performed in accordance with various embodiments of the present invention. Initially, the routine 200 provides a preamp that has heat source and a serial port interface in step 212 that are each connected to a demultiplexer. Step 214 then provides a system on chip (SOC) that has a multiplexer that reduces the number of transmission lines needed to connect the SOC to the preamp through a dynamic region of the PCCA. The demultiplexer is next supplied with PECL signals in step 216 generated from a phase locked loop attained from a subject data medium. In conjunction with the PECL signals, the demultiplexer receives a read/write channel connection in step 218 that supplies a selection signal from a write gate or read gate.

A determination is then made at decision 220 whether a read operation is being undertaken with respect to the subject data medium. If a read operation is ongoing or immediately pending, step 222 disengages the heat source and write driver while a portion of the transducing head, such as head 192 of FIG. 3, senses data from the subject data medium. As a result of step 222, data bits can be read and stored elsewhere, as desired, while the heat source is deactivated and not heating any portion of the subject data medium.

However, the scheduling of a write operation and not a read operation engages the heat source and write driver to program data bits onto the subject medium in step 224. The demultiplexer can provide heat source driver signals will match write driver signals to program data bits on the subject medium with enhanced accuracy and lower junction diode temperature due to pulsing. Hence, step 224 signals the heat source to heat a designated bit or bits of the subject medium in conjunction with a write driver recording a predetermined logical state to the heated bit or bits due to the synchronization of the R/W channel through the selection signal and the demultiplexer of the preamp.

At the conclusion of either step 222 or 224, the routine 210 can loop back to decision 220 as further reading or writing operations can be undertaken sporadically or continuously. It can be appreciated that from routine 210 that a read or write operation induces a demultiplexer to activate heat assisted data recording during write operations and unassisted data reading. However, the routine 210 is merely an exemplary operation process which is not limited and in which the various steps can be modified, moved, or removed, as desired.

It can be appreciated that the configuration and material characteristics of the control circuitry described in the present disclosure allows for heat assisted data recording with enhanced operating efficiency. The selective activation of either a heat source driver or serial port interface allows for control of the laser pulsing without the addition of control lines on the PCCA or input pads on the preamplifier. Moreover, the ability to reliably correlate the heat source operation with the writing of data through PECL signals derived from servo data attained from the subject data medium allows for precise programming of heated data bits and lowers the duty cycle and temperature of the heat source.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
  a heat source directed at a data storage medium and a serial interface each selectively activated via a demultiplexed write gate signal, the selective activation lowering a duty cycle and temperature of the heat source during a write operation.

2. The apparatus of claim 1, wherein the heat source is a laser and is a driver circuit.

3. The apparatus of claim 1, wherein the write gate signal is sent via a read/write channel that is connected to both a multiplexer and a write driver.

4. The apparatus of claim 1, wherein the selective activation of the heat source corresponds to an external pulse control and data being written to the data storage medium, and activation of the serial interface corresponds to a state where data is not being written to the data storage medium.

5. The apparatus of claim 1, wherein either the serial interface or heat source is exclusively activated or deactivated.

6. The apparatus of claim 1, wherein activation of the heat source engages heat assisted magnetic recording (HAMR) where a bit cell of the data storage medium is heated immediately prior to and during a write driver programming a logical state to the bit cell.

7. The apparatus of claim 1, wherein the apparatus is a preamp in a disk drive.

8. The apparatus of claim 1, wherein the serial interface receives an enable signal and a clock signal from the demultiplexer during activation.

9. The apparatus of claim 1, wherein the heat source receives low-voltage differential pulse signals from the multiplexer during activation.

10. The apparatus of claim 1, wherein a preamp register stores a pulse profile that defines a laser driver current amplitude, duration, phase, and number of pulses for the heat source for a selected bit cell.

11. The apparatus of claim 1, wherein the heat source synchronization signal is activated during a write mode and the serial interface command is activated during a non-write mode.

12. A method comprising:
providing a heat source directed at a data storage medium; and
activating the heat source selectively via a demultiplexed write gate signal, the selective activation lowering a duty cycle and temperature of the heat source during a write operation.

13. The method of claim 12, wherein the heat source is activated with a selection signal from a read/write channel that concurrently activates a write driver.

14. The method of claim 12, wherein a serial interface is deactivated when the heat source is activated.

15. The method of claim 12, wherein the demultiplexer receives positive emitter coupled logic (PECL) signals from a controller.

16. The method of claim 15, wherein the PECL signals are derived from a phased locked loop attained from the data storage medium.

17. The method of claim 15, wherein the PECL signals provide a clock signal that synchronizes the heat source with a bit cell of the data storage medium and indicate a boundary between data bits on the data storage medium.

18. A heat assisted magnetic recording (HAMR) system comprising a heat source and a preamp, the heat source directed at a data storage medium and serial interface, the preamp configured with multiplexed transmission lines that transmit a pulsed laser clock signal synchronization for each cell during a write mode and transmit a serial interface command during a read mode, the heat source and serial interface each selectively activated via a demultiplexed write gate signal to lower a duty cycle and temperature of the heat source during the write mode.

19. The HAMR system of claim 18, wherein the pulsed laser clock signal is derived from a phase locked loop synchronized to servo data written on a corresponding data storage medium.

20. The HAMR system of claim 18, wherein the write mode and read mode are indicated by a write gate signal connected to a write driver and the multiplexer.

* * * * *